April 19, 1955 F. KESSLER 2,706,747

SELECTOR REPEATER FOR TELEPHONE SYSTEMS

Filed Dec. 28, 1951 4 Sheets-Sheet 1

INVENTOR.
FRANK KESSLER

BY T. L. Bowes
ATTORNEY

April 19, 1955 F. KESSLER 2,706,747

SELECTOR REPEATER FOR TELEPHONE SYSTEMS

Filed Dec. 28, 1951 4 Sheets-Sheet 2

INVENTOR.
FRANK KESSLER

BY J. L. Bowes

ATTORNEY

SELECTOR REPEATER FOR TELEPHONE SYSTEMS

Filed Dec. 28, 1951 4 Sheets-Sheet 3

INVENTOR.
FRANK KESSLER
BY
ATTORNEY

April 19, 1955 F. KESSLER 2,706,747

SELECTOR REPEATER FOR TELEPHONE SYSTEMS

Filed Dec. 28, 1951 4 Sheets-Sheet 4

INVENTOR.
FRANK KESSLER
BY T. L. Bowes
ATTORNEY

United States Patent Office 2,706,747
Patented Apr. 19, 1955

2,706,747

SELECTOR REPEATER FOR TELEPHONE SYSTEMS

Frank Kessler, Los Angeles, Calif., assignor to Stromberg-Carlson Company, a corporation of New York Application December 28, 1951, Serial No. 263,909

4 Claims. (Cl. 179—17)

Figure 1:
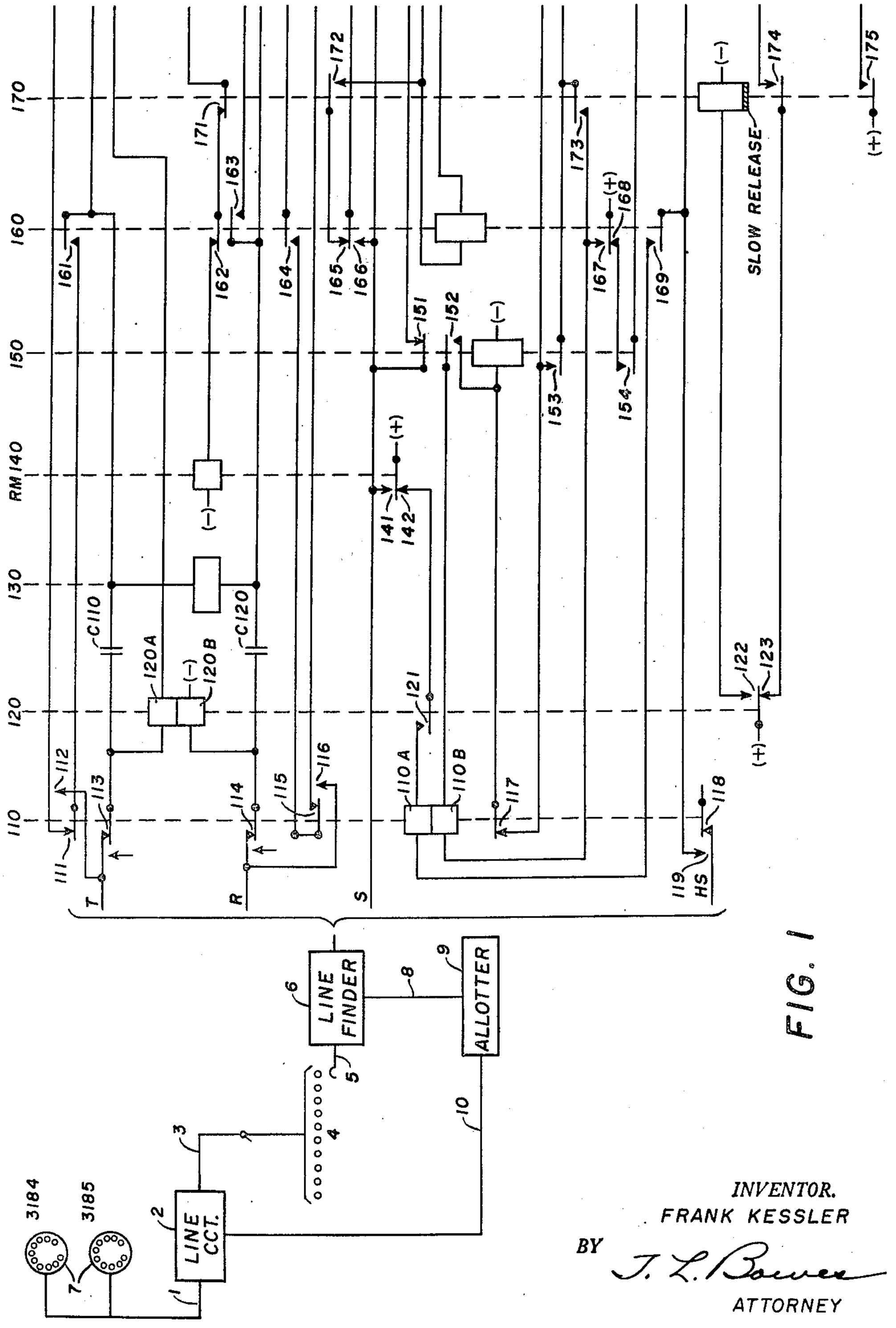

This invention relates to telephone systems and more particularly to selector-repeater circuits for use in automatic telephone systems.

In previous circuits of the selector-repeater type, step-by-step switches have been employed and impulsing and transmission means have been provided.

It is an object of my invention to provide switch-through of such a selector-repeater on reverting calls when the calling party hangs up.

Still another object of my invention is to provide revertive ringing on a calling line which has been extended through a selector-repeater by switching out the repeater bridging equipment so that the calling line is connected directly through to the reverting call equipment.

The features of my invention which I believe to be novel are set forth with particularity in the appended claims. My invention itself, both as to its organization and manner of operation, together with further objects and advantages thereof may best be understood by reference to the following description taken in connection with the accompanying drawing in which Figs. 1 and 2 form a selector-repeater switch circuit embodying the principles of my invention, and Figs. 3 and 4 disclose a reverting call circuit adapted for use with the selector-repeater of Figs. 1 and 2.

In Figs. 1 to 4, there are illustrated in block diagram form certain necessary components of an automatic telephone system, embodying my invention, each of which may be entirely conventional and any components known to the art may be utilized for the designated functions and purposes. The selector-repeater and reverting call circuits are illustrated and described in detail.

A suitable subscriber's line, indicated by numeral 1, terminates in a suitable line circuit 2, and line circuit 2 is connected, as indicated by numeral 3 to a terminal in the bank 4 of the line finder 6 which seeks the position of the calling subscriber's line by means of a suitable switch including wiper 5 in a manner well known in the art. The operation of line finder 6 may be controlled by an allotter 9 over suitable leads indicated generally by numerals 8 and 10 in a manner also well known.

Figure 2:
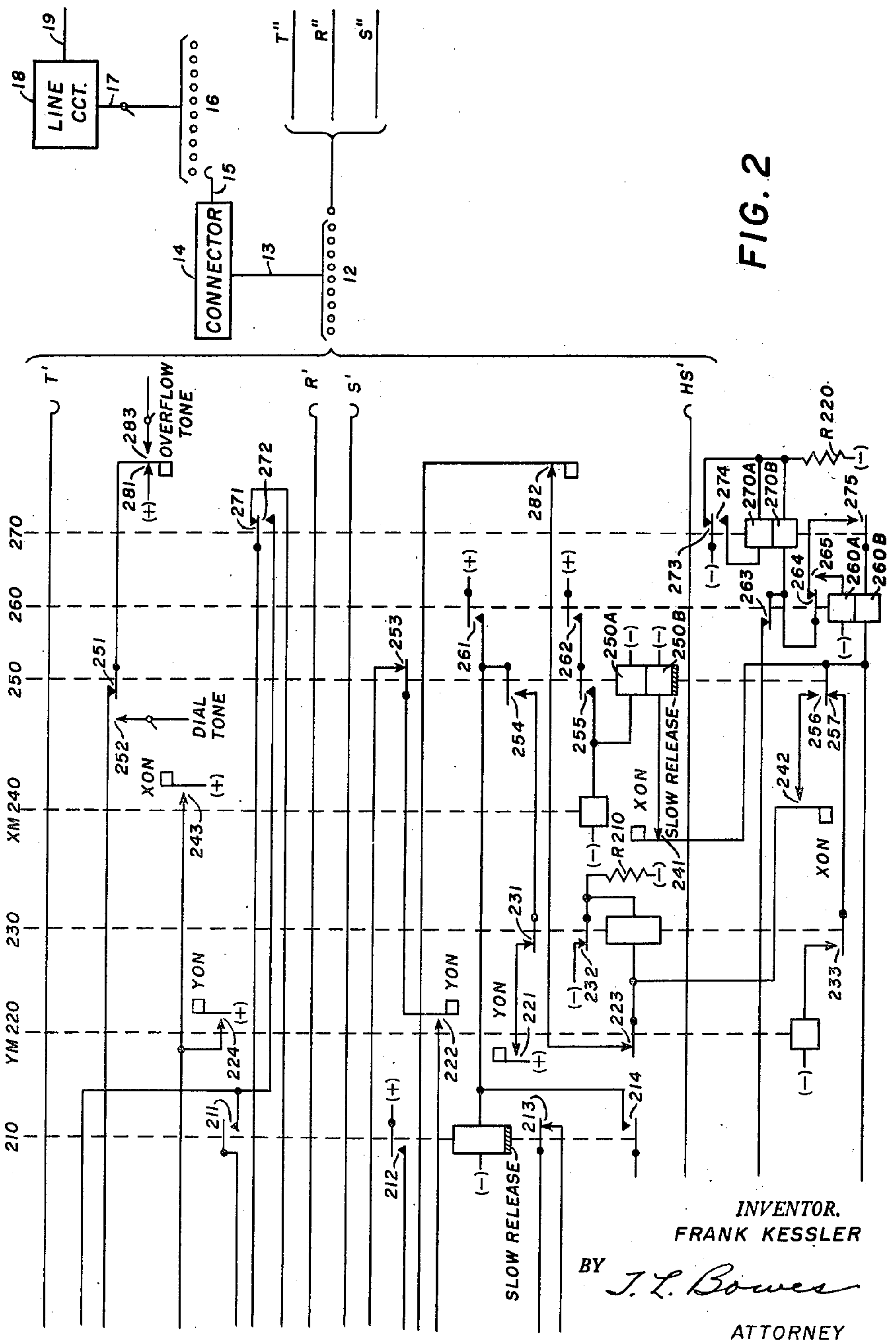

Line finder 6 is shown connected directly to the selector-repeater circuit, illustrated in detail in Figs. 1 and 2, by incoming tip lead T, ring lead R, sleeve lead S and auxiliary lead HS, as indicated.

Switch wipers T′, R′, S′ and HS′ of the selector-repeater switch, shown in Fig. 2, are arranged to be directively stepped to a required group of connectors or through other ranks of switches as desired and constitute outgoing leads for the purposes of this invention. Selection of an individual idle connector or selector is automatically performed as described below. Wipers T′, R′, S′ and HS′ may thus be connected to a connector 14 by means of bank 12 and leads indicated by numeral 13. It will be understood that each wiper T′, R′, S′ and HS′ is arranged for cooperation with its own set of contacts. One level of one contact set is shown for convenience.

Connector 14 is directively operated by a calling subscriber on line 1 to connect wipers 15 of connector 14 to called line 19 by way of bank 16, suitable leads indicated by numeral 17, and line circuit 18.

Figure 3:
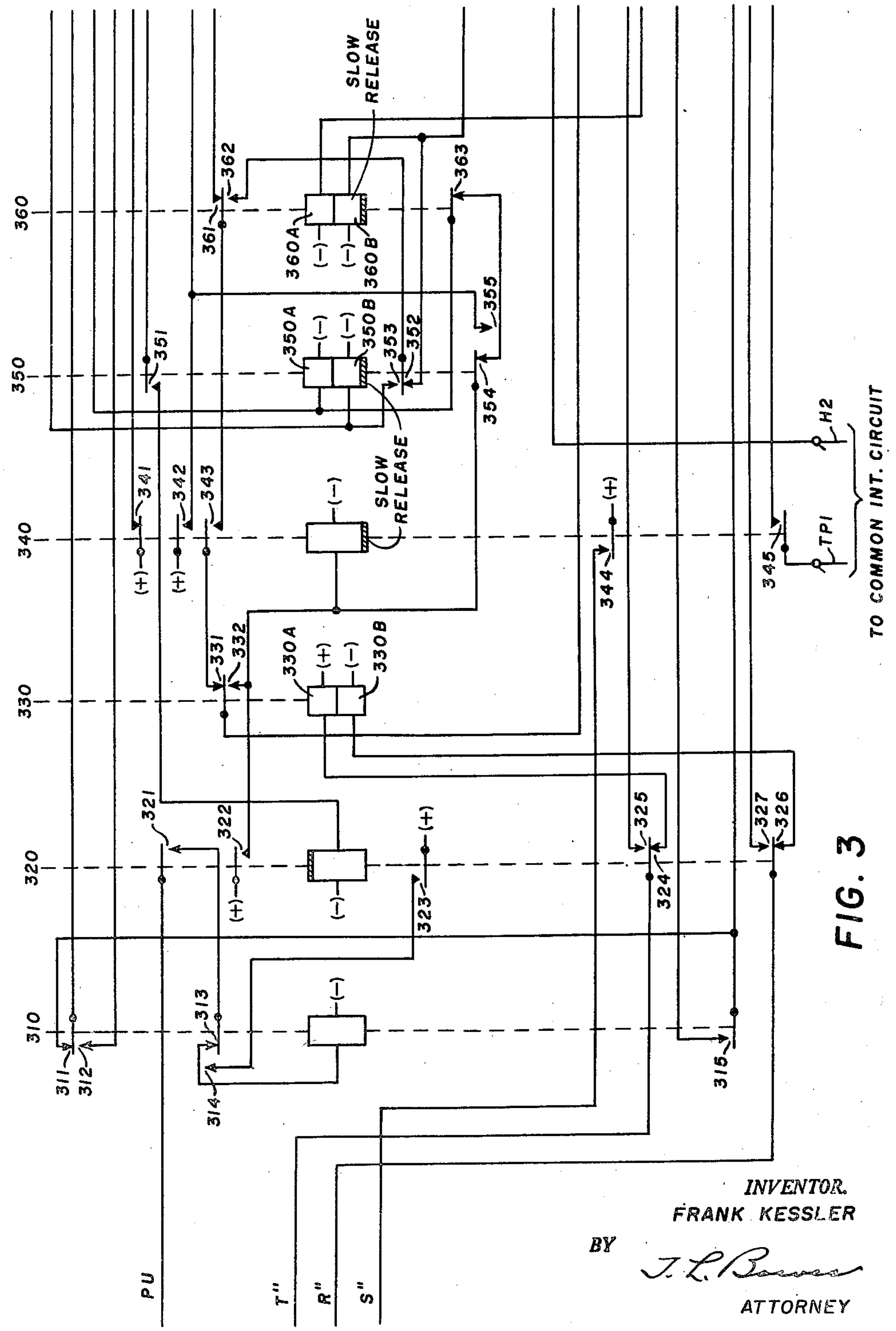
Figure 4:
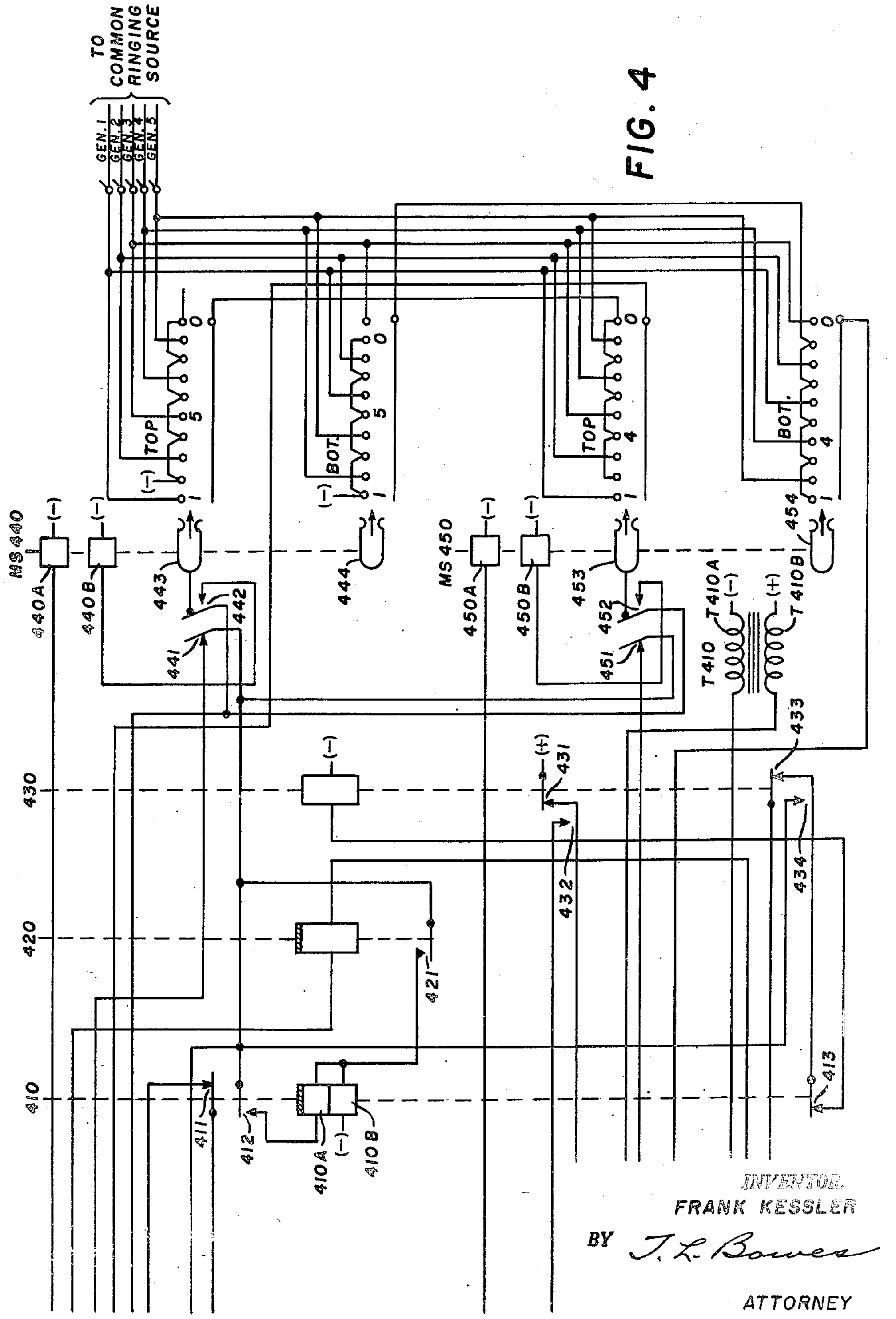

The selector wipers T′, R′, S′ also may be connected to an idle reverting call circuit, illustrated in detail in Figs. 3 and 4, by way of leads T″, R″, and S″ which terminate in one of the selector bank levels, such as the tenth level, for example.

While the switch described in the following detailed specification is preferably of the rectangular coordinate type known as the XY type, any other suitable two-motion switch may be used.

There follows a detailed description of a call extended from a calling subscriber's station on line 1 to a called subscriber's station on line 19, as well as a call between two different parties on line 1.

*Call between different lines*

On removal of the calling subscriber's receiver or handset from its cradle or support, a connection is initiated through finder 6 in a well known manner over conductors T, R, S and HS to the selector-repeater of Figs. 1 and 2. Calling bridge relay 120 operates from the grounded positive terminal of the battery supply, indicated by the symbol (+), through normally closed overflow contacts 281 (Fig. 2), normally closed contacts 251, calling bridge relay winding 120A, normally closed contacts 113, tip conductor T, calling subscriber's substation loop circuit, ring conductor R, normally closed contacts 114, and calling bridge relay winding 120B, to battery, indicated by the symbol (—).

Retard coil 130 is connected across conductors T and R by means of suitable condensers C110 and C120, to provide a holding loop to succeeding equipment without loss of transmission effectiveness.

Relay 120, upon operating, opens normally closed contacts 123 and closes ground through operated contacts 122, and winding of release delay relay 170 to battery to operate slow-to-release relay 170 which remains operated until the calling subscriber abandons the call or until switching relay 110 operates.

X-delay relay 250 now operates from ground over a circuit including operated contacts 175, X off-normal contacts 241 and relay winding 250B to battery, to prepare circuit paths for the operation of switch stepping magnet XM240 at contacts 255, and to connect dial tone to the calling subscriber's line through operated contacts 252, coil winding 120A, normally closed contacts 113, tip conductor T, substation loop, ring conductor R, normally closed contacts 114, and coil winding 120B, to battery, thereby indicating to the calling subscriber that dialing may now proceed.

If the calling subscriber on line 1 abandons the call without dialing, calling bridge relay 120, release delay relay 170, and X-delay relay 250 restore to return the circuit to its normal condition. It may be noted that if the calling subscriber abandons the call after dialing at least one digit and before the called station answers, calling bridge relay 120 and release delay relay 170 restore to operate the switch release magnet RM140 from ground at operated off-normal contacts 243 or 224, normally closed contacts 171 and 162, and release magnet winding RM140 to battery.

The previously described operation of relay 250 also effects energization of pulse delay relay 210 over a circuit extending from ground through Y off-normal contacts 221, normally closed contacts 231, operated contacts 254, and relay winding 210 to battery. Pulse delay relay 210, upon operating, connects ground through operated contacts 212, and normally closed contacts 151 to sleeve conductor S to hold the preceding equipment operated until the calling subscriber on line 1 releases the call.

Upon the dialing of a number by the calling subscriber, as by means of a dial 7 or other directively controlled device, the calling loop thereupon opens one or more times depending upon the number dialed, to restore calling bridge relay 120 the same number of times, and to correspondingly disconnect ground from relay 170 at contacts 122. However, release delay relay 170, being slow to release, remains operated during the momentary intervals when ground is disconnected.

Upon each release or restoration of calling bridge relay 120, a circuit is completed from ground through contacts 123, operated contacts 174, normally closed contacts 263, and X-assist relay winding 270B to direct battery through normally closed contacts 273 and to resistance battery at resistor R220. This connection of relay 270 insures fast operation, relay 270 holding operated on resistance battery.

Calling bridge relay 120 restores more quickly on a calling subscriber's line which has series resistance in the line conductors, and less quickly on a line which has capacitance such as ringers bridged across the conductors or connected between each conductor and ground. Leakage due to faulty insulation across the line conductors or to ground also causes relay 120 to restore less quickly. The different conditions encountered cause, in effect, the transmission of pulses of different lengths.

In order to correct shortened pulses to more acceptable lengths for switch operation, X-assist relay 270, upon operating, disconnects direct battery from relay winding or coil 270B at contacts 273, and connects battery through operated contacts 274 and X-assist winding 270A to the common terminal of winding 270B and resistor R220, to cause relay 270 to remain operated for a longer time.

The operation of X-assist relay 270 also closes contacts 275 to operate pulse repeat relay 260 from ground through operated contacts 175, pulse repeat coil winding 260B, operated contacts 275, normally closed contacts 264, and X-assist winding 270B to resistance battery at resistor R220 and also through winding 270A and operated contacts 274 to direct battery.

The operation of pulse repeat relay 260 effects the disconnection of battery at now open contacts 264, but applies battery through pulse repeat relay winding 260A and operated contacts 265 to keep pulse repeat relay 260 operated until its circuit is disconnected at contacts 275 when X-assist relay 270 restores.

Pulse repeat relay 260, upon operating, also interrupts the holding circuit for X-assist relay 270 at contacts 263, whereupon relay 270 is disconnected, causing it to restore and to open operated contacts 275 which in turn disconnects the holding circuit for pulse repeat relay 260. It is thus seen that relays 260 and 270 interact with each other to produce an arbitrary length of pulse for more dependable switch operation and for better repetition of pulses to succeeding equipment.

Pulse repeat relay 260, upon operating, also connects ground through operated contacts 262 and 255 to X-delay relay winding 250A and also to the winding of the primary movement of X magnet XM240. The operation of pulse repeat relay 260 also establishes, through operated contacts 261, an obvious circuit for holding pulse delay relay 210 operated when the previous holding ground is removed by the operation of hunt assist relay 230 upon the first step of the selector switch in the X direction and again when the Y off-normal springs are opened on the first step in the Y direction. Relay 210, being slow to release, holds up through the pulsing of relay 260. Each operation of pulse repeat relay 260 also steps the switch in the primary or X direction over the previously traced stepping circuit for the X-magnet through contacts 262 so that the X wipers are moved to the dialed level of bank contacts in Fig. 2. X-delay relay 250 remains operated while pulsing of relay 260 proceeds because of its slow-to-release characteristic. At the completion of pulsing, however, X-delay relay 250 restores as ground pulses through contacts 262 and 255 cease.

X-delay relay 250, upon restoring at the end of the first digit, disconnects dial tone and its superimposed ground at now open contacts 252. The calling bridge relay is held operated, however, over a circuit extending from ground through overflow contacts 281 and normally closed contacts 251.

X-delay relay 250, upon restoring, also connects sleeve lead S, which is connected to ground through operated contacts 212 and normally closed contacts 151, to the winding of switching relay 160 by way of Y off-normal contacts 222, which are closed when the switch moves in the secondary or Y direction, and normal contacts 253.

Referring back to the energization of X-magnet XM240, hunt assist relay 230 operates on the first primary direction step from ground through operated contacts 175, operated contacts 256, operated X off-normal contacts 242 and hunt assist coil winding 230 to direct battery through normally closed contacts 232 and to resistance battery at resistor R210.

When the delay relay 250 restores, contacts 256 open and normally closed contacts 257 complete a circuit to operate Y magnet YM220 and to advance the selector switch one step in the secondary or Y direction from ground through operated contacts 175, normally closed contacts 257, operated contacts 233, and the winding of Y magnet YM220, to battery.

Assuming that the connector corresponding to the first terminal or contact in the S bank of the selected level is idle, in which case there is no ground connected to that terminal, hunt assist relay 230 restores and Y magnet YM220 does not receive any further stepping pulses.

If the S bank contact is connected to ground, indicative of a busy condition, hunt assist relay 230 restores when X-delay relay 250 restores but reoperates when Y magnet YM220 restores over a circuit extending from ground in bank 12, wiper S′, normally closed contacts 165, operated contacts 172, overflow contacts 282, Y magnet interrupter contacts 223, and the winding of hunt assist relay 230 to battery through normally closed contacts 232 and to resistance battery at resistance R210. Hunt assist relay 230, upon reoperating, closes contacts 233 to reoperate Y magnet YM220 as previously described. Y magnet YM220, upon operating, opens contacts 223 to restore hunt assist relay 230. Relay 230 in restoring also recloses its contacts 232 to short circuit resistance R210 which makes for a fast response of relay 230 on its next operation.

This interaction between hunt assist relay 230 and Y magnet YM220 continues until the sleeve wiper S′ steps to an ungrounded bank contact. At this time, switching relay 160 operates from ground through operated contacts 212, normally closed contacts 151, normally closed contacts 253, operated off-normal contacts 222, winding 160, overflow contacts 282, Y magnet interrupter contacts 223, and hunt assist winding 230, to battery through contacts 232 and resistance battery at resistor R210. Because of the comparatively high resistance of the winding of relay 160, hunt assist relay 230 does not operate in series with relay 160 in this circuit.

If all of the connectors associated with the selected selector bank level are engaged, the switch steps to the overflow position. In such case, in order to indicate an all-links-busy condition to the calling subscriber, overflow tone is connected to the line through overflow contacts 283 which are connected to ground with overflow tone superimposed. Operation of the overflow springs also opens springs 282 to prevent operation of switching relay 160.

Referring again to switching relay 160, upon operating, that relay connects back sleeve lead S to wiper S′ through operated contacts 166 to give a busy indication to other calls to the same bank level 12; connects retard coil 130 through operated contacts 161 and 164 and normally closed contacts 111 and 115, respectively, to the tip and ring wipers T′ and R′, respectively, to operate the calling bridge relay of connector 14 in a well known manner which connects holding ground to the S bank contact in level 12 and to wiper S′; operates switching relay 150 from ground through operated contacts 167, operated contacts 173, normally closed contacts 213 and 117, and the winding of switching relay 150 to battery; and establishes a holding circuit for itself from ground on wiper S′ through operated contacts 166, normally closed contacts 253, operated contacts 222, winding of relay 160, normally closed contacts 282, normally closed contacts 223, winding of relay 230, and normally closed contacts 232, to battery.

Switching relay 150, upon operating, connects its winding through operated contacts 152, switching relay winding 110B, and operated contacts 167 to ground. Switching relay 110 does not operate at this time as winding 110B is short circuited through operated contacts 152, normal contacts 117, operated contacts 153 and 173 until operated contacts 173 are opened when release delay relay 170 releases on a reverting call, as described later.

The ground on wiper S′, through operated contacts 212 and normally closed contacts 151, is disconnected after slow-to-release pulse delay relay 210 restores, so that the apparatus shown in Figs. 1 and 2 is thereafter held from ground on the sleeve lead at connector 14.

Calling bridge relay 120, pulse repeat relay 260, and X-assist relay 270 respond, as previously described, to the dialing of the remaining digits and repeat the pulses through normally closed contacts 271, operated contacts 164, and normally closed contacts 115, brush R′ and bank 12 to a suitable calling bridge relay, not shown, in connector 14.

Pulse delay relay 210 operates and remains operated during each digit to shunt out, through operated contacts 163 and 211, retard coil 130 and condensers C110 and C120, in order to provide for better pulsing conditions. The called party is now signaled in any well known manner.

When the called subscriber answers in the regular manner, connector 14 is caused, in any suitable manner, not shown, to connect resistance battery to the proper HS bank contact, wiper HS', operated contacts 169, switching relay winding 110A, operated contacts 121, and normally closed contacts 142 to ground.

Switching relay 110, upon operating from resistance battery on the HS' lead, opens normally closed contacts 117, removing the short circuit across winding 110B, so that switching relay 110 remains operated from ground by way of operated contacts 167, winding 110B, closed contacts 152, and switching B relay 150 to battery; connects lead or conductor HS to wiper HS' at operated contacts 119 in order to provide for answering supervision to preceding circuits as required; opens the circuit to the calling bridge relay 120 at normally closed contacts 113 and 114; and connects tip and ring leads T and R to selector brushes T' and R' through contacts 112 and 116, respectively.

Calling bridge relay 120, upon restoring, opens operated contacts 121 to remove winding 110A from the HS lead, and to open the ground connection at contacts 122 to release delay relay 170 (which has no effective result at this time).

The calling subscriber on line 1 is now connected to the called subscriber and conversation may proceed in the normal manner.

When the calling subscriber abandons the connection by opening the loop across the tip and ring conductors T and R, connector 14 removes ground from the sleeve terminal in the selector bank 12 to de-energize and restore switching relay 160 and similar relays in preceding circuits.

Switching relay 160, upon restoring, connects ground through normally closed contacts 171 and 162, shunt connected and operated X off-normal contacts 243 and Y off-normal contacts 224, and release magnet RM140, to battery. Release magnet RM140, upon operating, restores the switch mechanism to its normal condition to open both off-normal springs 224 and 243 and thereby restore release magnet RM140 to its normal condition; and reconnects ground to sleeve lead S to busy the selector-repeater circuit to additional calls until the switch associated with the selector-repeater has fully restored.

Switching relay 160, upon restoring, also removes ground from switching relay 110 at contacts 167. Relay 110 restores.

*Reverting call*

The sequence of operation during a reverting call is next described.

Assuming that the calling subscriber at subscriber station 3185 on line 1 desires to call another party on his own line, as for example, station 3184. In response to the removal of the handset from its hook or cradle at the calling substation, the selector-repeater of Figs. 1 and 2 is seized as previously described to energize relays 120, 170, 250 and 210 as described. The digits 054 are now dialed. The digit 0 is first dialed in order to gain access to the reverting call circuit 21, shown in detail in Figs. 3 and 4, connected into the tenth level of bank 12.

Calling bridge relay 330, in the reverting call circuit, Figs. 3 and 4, now operates from ground through calling bridge relay winding 330A, normally closed contacts 324, tip conductor T'', tip terminal of bank 12, wiper T' of the selector-repeater switch of Fig. 2, normally closed contacts 111, operated contacts 161, retard coil winding 130, normally closed contacts 271, operated contacts 164, normally closed contacts 115, wiper R' of the selector-repeater switch of Fig. 2, ring terminal of bank 12, ring conductor R'', normally closed contacts 326, and calling bridge relay winding 330B to battery.

Operation of calling bridge relay 330 connects ground to operate release delay relay 340 from ground by way of normally closed contacts 431 and operated contacts 332 to the coil of relay 340 and also to operate the first X delay relay 350 from ground through normally closed contacts 431, operated contacts 332, normally closed contacts 354, normally closed contacts 363, and X delay relay winding 350A to battery.

X delay relay 350 thereupon operates, and until the second X delay relay 360 operates, momentarily locks from ground through operated contacts 342, operated contacts 355, normally closed contacts 363, and X delay relay winding 350A to battery. X delay relay 350 is additionally locked from ground through operated contacts 342, normally closed contacts 441 of minor switch MS440, and X delay relay winding 350A to battery. X delay relay 360 operates from ground, through operated contacts 342, normally closed contacts 451 of minor switch MS440, and X delay relay winding 360A to battery.

Returning to the operation of release delay relay 340, that relay upon operating, connects ground through operated contacts 344 to sleeve conductor S'' to the selector-repeater (Figs. 1 and 2) to prevent the release of the preceding equipment.

The calling subscriber's station digit, in this case the digit 5, is now dialed, followed by digit 4 which is the assumed called subscriber's station digit.

Upon the dialing of the station digits by the calling subscriber, the calling loop thereupon opens five and four times, respectively, to restore calling bridge relay 330 the same number of times for each digit, and correspondingly to disconnect ground from release delay relay 340 at contacts 332. However, release delay relay 340, being slow-to-release, remains operated during the momentary intervals when ground is disconnected.

Upon each release or restoration of calling bridge relay 330, a circuit is completed from ground through normally closed contacts 431, momentarily closed contacts 331, operated contacts 343, operated contacts 362, operated contacts 353, and the X delay relay winding 350B to battery, and also through the minor switch step magnet winding 440A to battery.

Connection of ground to step magnet 440A during the dialing of the digit "5" causes the wipers 443 and 444 of a first minor switch MS440 to advance one step for each momentary pulsing ground so that these wipers finally stop on the fifth contact of the minor switch bank to connect the proper source of ringing current to the calling subscriber's station during the subsequent revertive ringing period.

As minor switch step magnet 440A operates on the first step, normally closed contacts 441 are opened to de-energize X delay relay winding 350A. X delay relay 350 does not restore at this time because its slow-to-release characteristic holds it operated during the momentary intervals in which ground is disconnected while calling bridge relay 330 is responding to the dialed digit. When calling bridge relay 330 completes its response to the dialed digit, X delay relay 350 is de-energized at now open contacts 331 and restores to transfer the stepping circuit from first step magnet 440A to second step magnet 450A of a second minor switch MS450, the circuit extending from ground, by way of normally closed contacts 431, momentarily closed contacts 331, operated contacts 343, operated contacts 362, normally closed contacts 352, and the X delay relay winding 360B to battery, and also step magnet 450A to battery.

Upon each release or restoration of calling bridge relay 330 during the next digit, the above circuit is completed from ground to pulse magnet 450A to advance the wipers 453 and 454 of minor switch MS450 one step for each momentary pulsing ground so that these wipers finally stop on the fourth position of the minor switch bank contact to connect the proper source of ringing current to the called subscriber's station during the subsequent revertive ringing period.

As minor switch step magnet 450A is operated for its first step, normally closed contacts 451 are opened to de-energize X delay relay winding 360A. X delay relay 360, however, does not restore as its slow-to-release characteristic holds it operated during the momentary intervals in which ground is disconnected while calling bridge relay 330 is responding to the called subscriber's digit. When calling bridge relay 330 completes its response to the dialed digit, X delay relay 360 is again de-energized by the opening of contacts 331 and restores to reoperate X delay relay 350 from ground through normally closed contacts 431, operated contacts 332, normally closed contacts 354, normally closed contacts 363, and X delay relay winding 350A to battery. X delay relay 350, upon reoperating, locks through normally closed contacts 363, operated contacts 355, and operated contacts 342 to ground.

When the calling subscriber hangs up or replaces his receiver or handset in the conventional manner for starting the reverting call ringing function, calling bridge relay 120 releases or restores to disconnect ground at contacts 122 to cause the restoration of release delay relay 170. Restoration of release delay relay 170 opens the shunting circuit across coil winding 110B which has previously prevented switching relay 110 from operating. Switching relay 110 now operates and locks from ground through operated contacts 167, relay winding 110B, contacts 152 and winding of switching relay 150 to battery. Operation of switching relay 110 switches conductors T and R of the subscriber's line directly through to wipers T′ and R′ and to the reverting call circuit of Figs. 3 and 4, in a manner previously described for calls between two subscriber lines.

The release of calling bridge relay 120 also restores calling bridge relay 330 which closes contacts 331 to operate switching relay 320, the circuit extending from ground through normally closed contacts 431, contacts 331 (which are now closed), operated contacts 343, normally closed contacts 361, normally closed contacts 411, operated contacts 351, and switching coil winding 320 to battery.

Switching relay 320, upon operating, connects ground through operated contacts 322, and release delay relay winding 340 to battery, to hold the preceding equipment. Switching relay 320, upon operating, also connects common pickup ground on conductor PU (Fig. 3) through contacts 321, normally closed contacts 313, and the coil or winding of pick-up relay 310 to battery. Pick-up relay 310, upon operating, locks from ground, through operated contacts 323, operated contacts 314 and the winding of relay 310 to battery. The pick-up relay 310 is provided to ensure a full ringing cycle.

Switching relay 320, upon operating, also opens normally closed contacts 324 and 326 to open the calling subscriber's tip conductor T″ and ring conductor R″, respectively. Operation of switching relay 320 also connects alternating ringing current to the calling line as follows, still assuming that station 5 is calling station 4; ground through transformer winding T410B, operated contacts 325, tip conductors T″, T′, and T, telephone ringer and condenser circuit (not shown) associated with line 1, ring conductors R, R′, and R″, operated contacts 327, ring trip relay winding 420, operated contacts 312, minor switch wiper 453 of switch MS450 to battery through contact 4 of the top level of switch MS450 and wiper 443, contact 5 of the top level of switch MS440, and GEN 3. If any subscriber on the calling line closes the loop circuit by removing his receiver or handset, ring trip relay 420 operates to initiate further circuit facilities as described subsequently.

After the pickup relay 310 operates as described previously, battery through transformer winding T410A is disconnected from ring trip relay winding 420 at contacts 311, and is connected through contacts 315, minor switch wiper 454 and bottom level bank contact 4 to common alternating ringing current GEN 4 which is induced through transformer T410 windings to operate the ringers on the calling subscriber's line.

Moreover, after the pickup relay 310 operates, ring trip coil winding 420 is connected through operated contacts 312, minor switch wiper 453, top level bank contact 4, minor switch wiper 443, and top level bank contact 5 to common alternating ringing current GEN 3. The common generator sources may be of the well known frequency type, and are connected to the generator leads at different intervals in the ringing cycle.

If the calling subscriber fails to dial after connecting to the reverting call circuit of Figs. 3 and 4, or if the ringing condition is permitted to continue for longer than an arbitrarily set time interval, ground is disconnected from the S″ conductor to restore all preceding equipment. For this purpose, after release delay relay 340 operates on seizure, time pulse lead TP1 (Fig. 3) momentarily connects ground in any suitable manner through operated contacts 345, normally closed contacts 433, normally closed contacts 413, and permanent timing relay winding 430 to battery. Permanent timing relay 430, upon operating locks through operated contacts 434 and operated contacts 342 to ground, and replaces ground to contacts 331 and 332 with hold ground on lead H2 which is arranged in any desired fashion to be disconnected after an arbitrary timing period. Disconnection of hold ground from contacts 331 and 332 causes release delay relay 340 to restore, thereby disconnecting holding ground at contacts 344 from sleeve conductor S″ to effect the release of preceding equipment.

If either station 4 or station 5 responds to the ringing signal, a loop circuit is established between tip conductor T and ring conductor R which causes a first ring trip relay 420 to operate over the circuit previously described, either while the alternating current is being applied or in the intervals between applications thereof.

Ring trip relay 420, upon operating, connects ground through operated contacts 342 and 421, and ring trip relay winding 410B of a second ring trip relay 410 to battery. Ring trip relay 410, upon operating, locks from ground through operated contacts 342, operated contacts 412, ring trip windings 410A and 410B in series to battery; opens the holding circuit for switching relay 320 at contacts 411; and disconnects hold ground through contacts 413 to restore permanent timing relay 430 in order to prevent the release of the preceding equipment after an arbitrary timing period.

Switching relay 320, upon restoring, restores pickup relay 310, disconnects the ringing sources at contacts 325 and 327, restores ring trip relay 420, and reconnects calling bridge relay 330 through contacts 324 and 326 to provide transmission battery for the stations on the calling line.

The reverting call circuit of Figs. 3 and 4, is now restored to its original condition, and conversation between the stations on the calling line may proceed as required.

When both stations replace their receivers or handsets, the loop holding circuit for calling bridge relay 330 is opened. Calling bridge relay 330, upon restoring, disconnects ground at contacts 332 from release delay relay 340 which restores to disconnect ground at contacts 344 from sleeve conductor S″ to restore all preceding equipment to its normal condition.

Restoration of release delay relay 340 connects ground through contacts 341, operated contacts 442, and release magnet winding 440B of minor switch MS440 to battery, and also through operated contacts 452 and release magnet winding 450B of minor switch MS450 to battery. Minor switches MS440 and MS450 restore to their normal condition responsive to the energization of release magnets 440B and 450B, respectively.

While I have shown and described a particular embodiment of my invention it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In a telephone system, a plurality of lines including a party line having a plurality of substations associated therewith; means including a selector-repeater controlled from any one of said lines for extending a call from said party line to the same or another line; a first relay in said selector-repeater, said first relay having a set of make contacts; means responsive to the seizure of said selector-repeater in response to a calling condition of one of said lines for operating said first relay; a switching relay in said selector-repeater having an operating winding; an electrical circuit shunting said winding and including said make contacts to prevent the operation of said switching relay; a reverting call circuit; directively controlled means for extending a connection from said selector-repeater to said reverting call circuit; means responsive to the replacing of the receiver by the calling party thereafter for releasing said first relay whereby said shunt circuit is opened; and means effective upon the opening of said shunt circuit for operating said switching relay to complete a circuit for applying a ringing signal to said party line.

2. In a telephone system, a plurality of lines including a party line having a plurality of substations associated therewith; means including a selector-repeater controlled from any one of said lines for extending a call from said party line to the same or another line; said selector-repeater having incoming and outgoing tip and ring conductors, a calling bridge relay, a step-by-step switch having associated bank contacts and arranged to be directively controlled in a primary direction and arranged to hunt in a secondary direction, a release delay relay, and first and second switching relays; means responsive to the seizure of said selector-repeater upon the initiation of a call for operating said calling bridge relay; means responsive to the operation of said calling bridge relay for operating said release delay relay; directively controlled means at said calling substation; a reverting call circuit connected to predetermined contacts in said switch banks, means responsive to said controlling means for causing said switch to seize said reverting call circuit; means responsive to the seizure of said reverting call circuit for operating said first switching relay; said second switching relay having an operating winding; a series circuit comprising said operating winding, operated contacts of said first switching relay and said release delay relay, and normal contacts of said second switching relay for shunting said operating winding and preventing the operation of said second switching relay; and means thereafter effective responsive to the restoration of the receiver at said calling substation for effecting the release of said release delay relay, thereby removing the shunt from said operating winding and effecting the operation of said second switching relay in order to connect the incoming and outgoing tip and ring conductors, respectively.

3. In a telephone system, a plurality of lines including a party line having a plurality of substations associated therewith; means including a selector-repeater controlled from any one of said lines for extending a call from said party line to the same or another line; said selector-repeater having incoming and outgoing tip and ring conductors, a calling bridge relay, a step-by-step switch having associated bank contacts and arranged to be directively controlled in a primary direction and arranged to hunt in a secondary direction, a release delay relay, and first, second and third switching relays; means responsive to the seizure of said selector-repeater upon the initiation of a call for operating said calling bridge relay; means responsive to the operation of said calling bridge relay for operating said release delay relay; directively controlled means at said calling substation; a reverting call circuit connected to predetermined contacts in said switch banks, means responsive to said controlling means for causing said switch to seize said reverting call circuit; means responsive to the seizure of said reverting call circuit for operating said first switching relay; means responsive to the operation of said first switching relay for operating said second switching relay; said third switching relay having an operating winding; a series circuit comprising said operating winding, operated contacts of said second switching relay and said release delay relay, and normal contacts of said third switching relay for shunting said operating winding and preventing the operation of said third switching relay; and means thereafter effective responsive to the restoration of the receiver at said calling substation for effecting the release of said release delay relay, thereby removing the shunt from said operating winding and effecting the operation of said third switching relay in order to connect the incoming and outgoing tip and ring conductors, respectively.

4. In a telephone system, a plurality of lines including a party line having a plurality of substations associated therewith; means including a selector-repeater controlled from any one of said lines for extending a call from said party line to the same or another line; said selector-repeater having incoming and outgoing tip and ring conductors, a calling bridge relay, a step-by-step switch having associated bank contacts and arranged to be directively controlled in a primary direction and arranged to hunt in a secondary direction, a release delay relay, and first, second and third switching relays; means responsive to the seizure of said selector-repeater upon the initiation of a call for operating said calling bridge relay, means responsive to the operation of said calling bridge relay for operating said release delay relay; directively controlled means at said calling substation; a reverting call circuit connected to predetermined contacts in said switch banks, means responsive to said controlling means for causing said switch to seize said reverting call circuit; means responsive to the seizure of said reverting call circuit for operating said first switching relay; means responsive to the operation of said first switching relay for operating said second switching relay, said third switching relay having an operating winding, a series circuit comprising said operating winding, operated contacts of said second switching relay and said release delay relay, and normal contacts of said third switching relay for shunting said operating winding and preventing the operation of said third switching relay; station signaling apparatus; means responsive to the further operation of said directively controlled means for selecting station signals corresponding to the calling and called substations on said party line; means thereafter effective responsive to the restoration of the receiver at said calling substation for effecting the release of said release delay relay, thereby removing the shunt from said operating winding and effecting the operation of said third switching relay in order to connect the incoming and outgoing tip and ring conductors respectively; and means responsive to the operation of said third switching relay for transmitting station signals over said line.

References Cited in the file of this patent

UNITED STATES PATENTS 2,147,235 Beale et al. ------------ Feb. 14, 1939